US010457239B2

(12) United States Patent
Schneider

(10) Patent No.: US 10,457,239 B2
(45) Date of Patent: Oct. 29, 2019

(54) FRONTAL AIRBAG SYSTEMS AND USES THEREOF

(71) Applicant: AUTOLIV ASP, INC., Ogden, UT (US)

(72) Inventor: David W. Schneider, Waterford, MI (US)

(73) Assignee: Autoliv ASP, Inc., Ogden, UT (US)

(*) Notice: Subject to any disclaimer, the term of this patent is extended or adjusted under 35 U.S.C. 154(b) by 82 days.

(21) Appl. No.: 15/823,162

(22) Filed: Nov. 27, 2017

(65) Prior Publication Data

US 2019/0161044 A1 May 30, 2019

(51) Int. Cl.
B60R 21/203 (2006.01)
B60R 21/233 (2006.01)
B60R 21/231 (2011.01)
B60R 21/205 (2011.01)
B60R 21/00 (2006.01)
B60R 21/16 (2006.01)

(52) U.S. Cl.
CPC .......... B60R 21/203 (2013.01); B60R 21/231 (2013.01); B60R 21/233 (2013.01); B60R 21/205 (2013.01); B60R 2021/0004 (2013.01); B60R 2021/0009 (2013.01); B60R 2021/161 (2013.01); B60R 2021/23107 (2013.01); B60R 2021/23308 (2013.01)

(58) Field of Classification Search
CPC ... B60R 21/203; B60R 21/205; B60R 21/233; B60R 2021/0004; B60R 2021/0009; B60R 2021/161; B60R 2021/23308
See application file for complete search history.

(56) References Cited

U.S. PATENT DOCUMENTS

| 3,752,501 | A | 8/1973 | Daniel et al. | |
| 4,169,613 | A * | 10/1979 | Barnett | B60R 21/233 |
| | | | | 280/732 |
| 5,609,356 | A | 3/1997 | Mossi et al. | |
| 5,630,614 | A | 5/1997 | Conlee et al. | |
| 7,108,279 | B2 | 9/2006 | Rensinghoff | |
| 7,210,701 | B2 | 5/2007 | Meissner et al. | |
| 7,942,443 | B2 * | 5/2011 | Dennis | B60R 21/206 |
| | | | | 280/729 |
| 9,180,834 | B1 * | 11/2015 | Le | B60R 21/231 |
| 2002/0149181 | A1 | 10/2002 | Eyrainer et al. | |

(Continued)

FOREIGN PATENT DOCUMENTS

DE 29700804 U1 5/1997
DE 202006001826 U1 5/2006

OTHER PUBLICATIONS

International Search Report and Written Opinion dated Dec. 11, 2018 for international application PCT/US2018/053198.

(Continued)

Primary Examiner — Drew J Brown
(74) Attorney, Agent, or Firm — Stoel Rives LLP

(57) ABSTRACT

An inflatable airbag system can be configured to be mounted to a frontal region of a vehicle. The inflatable airbag system can include an inflatable airbag cushion that can expand and deploy out of a first housing, and an inflatable support member that can expand and deploy out of a second housing. The inflatable support member can contact and urge a portion of the inflatable airbag cushion in a car-rearward direction.

24 Claims, 8 Drawing Sheets

(56) References Cited

U.S. PATENT DOCUMENTS

| | | |
|---|---|---|
| 2003/0218319 A1 | 11/2003 | Amamori |
| 2006/0202452 A1 | 9/2006 | Breed et al. |
| 2006/0232050 A1 | 10/2006 | Kumagai et al. |
| 2007/0046002 A1 | 3/2007 | Bito |
| 2013/0093171 A1 | 4/2013 | Eckert et al. |
| 2013/0285356 A1* | 10/2013 | Fischer ................ B60R 21/203 280/731 |
| 2016/0200281 A1 | 7/2016 | Takeshita et al. |
| 2017/0072891 A1* | 3/2017 | Paxton ................ B60R 21/205 |
| 2017/0072896 A1 | 3/2017 | Fukawatase et al. |
| 2017/0101071 A1 | 4/2017 | Kruse |
| 2017/0174171 A1 | 6/2017 | Dennis et al. |

OTHER PUBLICATIONS

International Search Report and Written Opinion dated Feb. 7, 2019 for international application PCT/US2018/062490.

* cited by examiner

US 10,457,239 B2

FRONTAL AIRBAG SYSTEMS AND USES THEREOF

TECHNICAL FIELD

The present disclosure relates generally to the field of automotive protective systems. More specifically, the present disclosure relates to frontal airbag systems that are configured to deploy in response to frontal collision events.

BACKGROUND

Inflatable airbags may be mounted within a vehicle and deploy during a collision event. The deployed airbag may cushion an occupant and prevent detrimental impact with other vehicular structures. Some airbags suffer from one or more drawbacks or may perform less than optimally in one or more respects. Certain embodiments disclosed herein can address one or more of these issues.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

DETAILED DESCRIPTION

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Inflatable airbag systems are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. In the following disclosure, "airbag" generally refers to an inflatable front airbag, such as, for example, a driver airbag that is typically housed within the steering wheel, steering column, or dashboard, although the principles discussed may apply to other types of airbags (e.g., passenger airbags, knee airbags, and side airbags).

Front airbags are often installed in a steering wheel, steering column, dashboard, or instrument panel of a vehicle. As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present.

During installation, the disclosed airbags are typically disposed at an interior of a housing in a packaged state (e.g., are rolled, folded, and/or otherwise compressed) or a compact configuration and may be retained in the packaged state behind a cover. During a collision event, an inflator is triggered, which rapidly fills the airbag with inflation gas. The airbag can rapidly transition from the packaged state of the compact configuration to an expanded state of a deployed configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

Figure 1A:
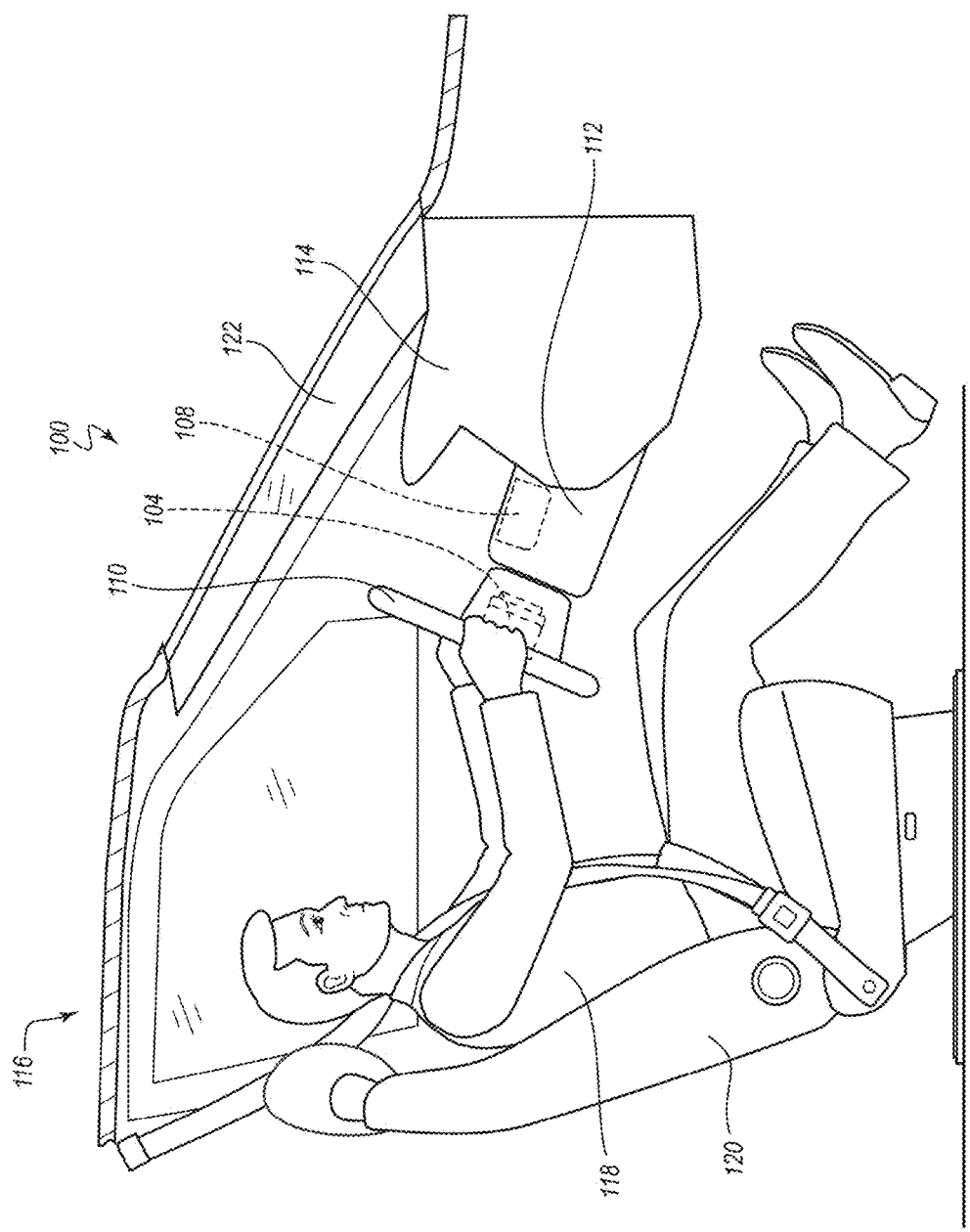
FIG. 1A is a side view of an interior side of a vehicle having an inflatable airbag system depicted in a compact configuration, according to one embodiment of the present disclosure.
Figure 1B:
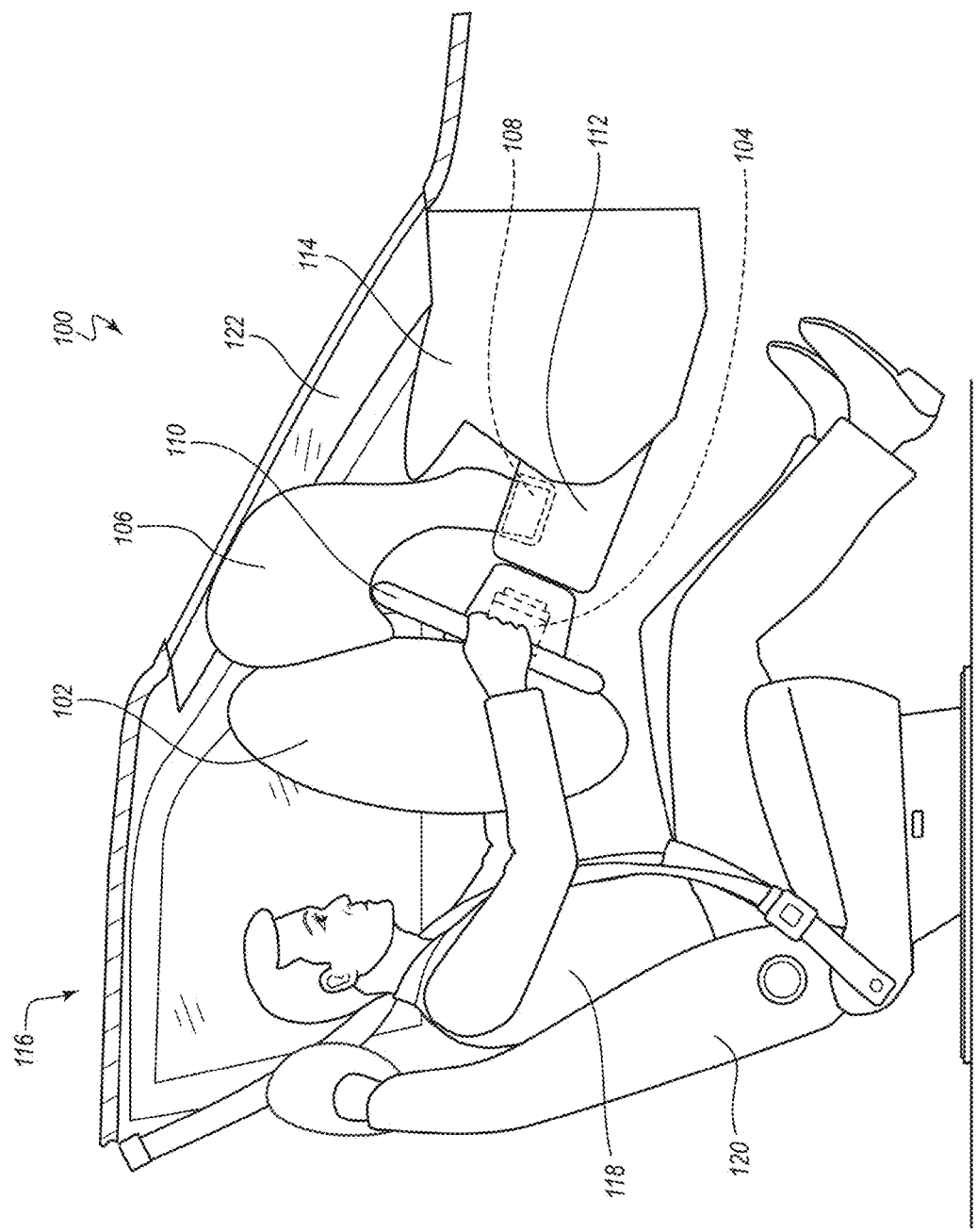
FIG. 1B is another side view of an interior side of a vehicle having the inflatable airbag system of FIG. 1A, with the inflatable airbag system deployed.
Figure 1C:
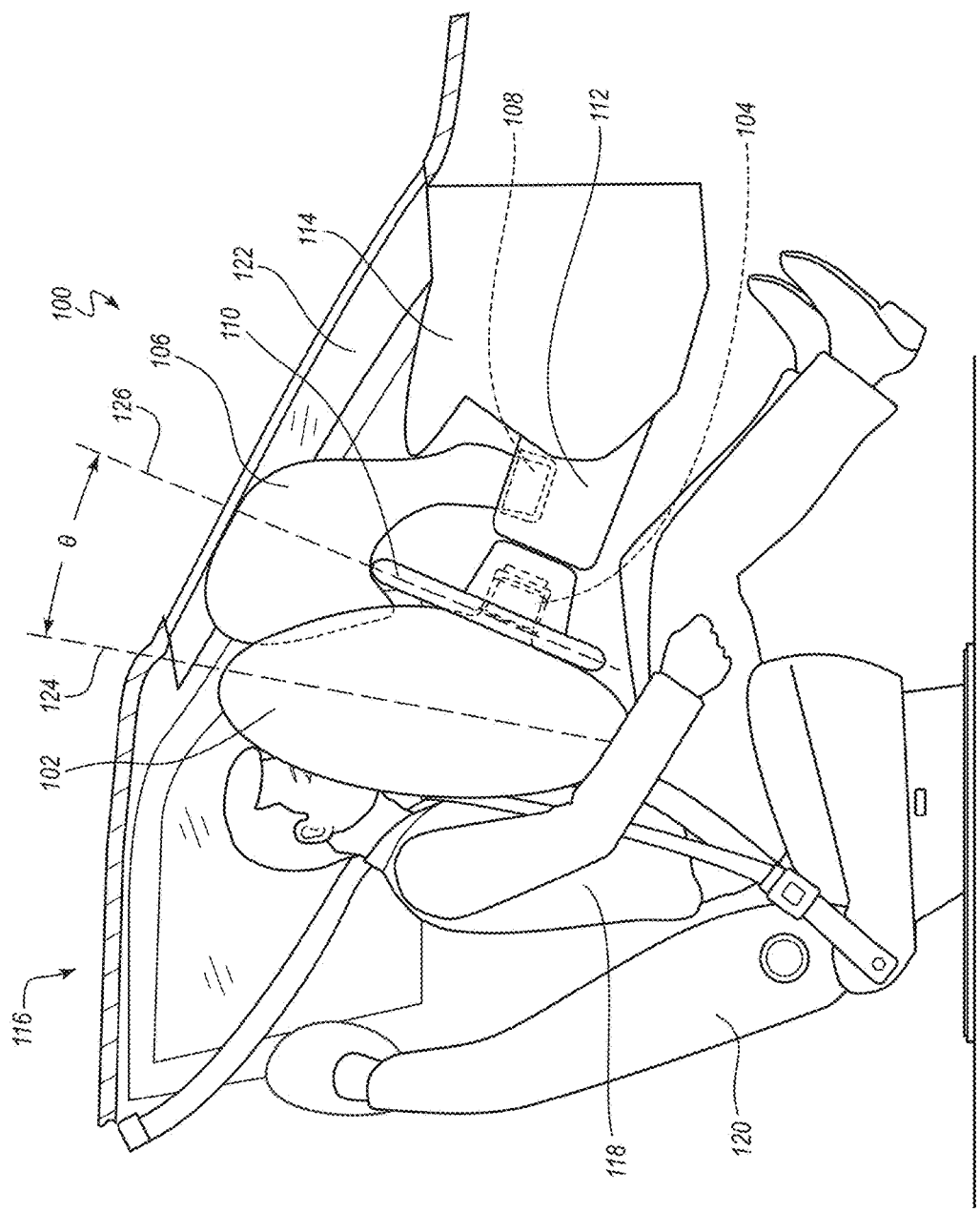
FIG. 1C is another side view of an interior side of a vehicle having the inflatable airbag system of FIG. 1A, depicting a passenger in contact with the deployed inflatable airbag system.

FIGS. 1A-1C depict an embodiment of an inflatable airbag system 100 mounted within the frontal region of a vehicle 116, according to one embodiment of the present disclosure. In FIGS. 1A and 1B, an occupant 118 is positioned on a seat 120, and in FIG. 1C, the occupant 118 is shown moving forward from the seat 120 relative to the vehicle 116. As shown in FIGS. 1A-1C, the vehicle 116 comprises one or more of a windshield 122, a dashboard (or instrument panel) 114, a steering wheel 110, and a steering wheel column 112. In some embodiments, the steering wheel 110 can be coupled to the steering wheel column 112 (also known as a steering column). In FIG. 1A, the inflatable airbag system 100 is in a packaged configuration or state, wherein the inflatable airbag system 100 is disposed within at least a portion of the steering wheel 110 and steering wheel column 112. In FIGS. 1B and 1C, the inflatable airbag system 100 is in a deployed configuration or state.

Figure 3:
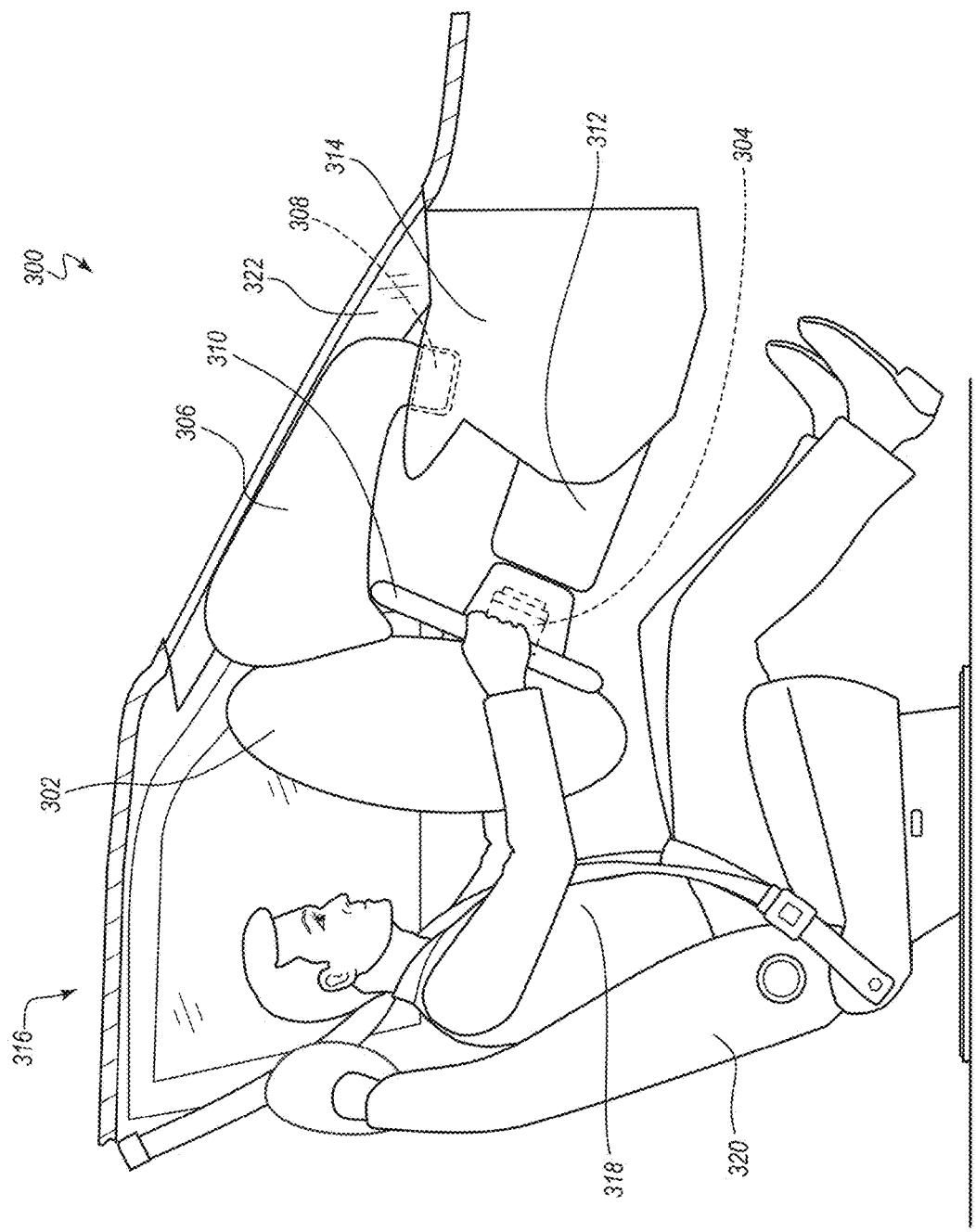
FIG. 3 is a side view of an interior side of a vehicle having an inflatable airbag system depicted in a deployed configuration, according to another embodiment of the present disclosure.

The inflatable airbag system 100 can include one or more of an inflatable airbag cushion 102, an inflatable airbag cushion housing 104 (which can also be described as simply a housing or first housing), an inflatable support member 106, and an inflatable support member housing 108 (which can also be described as simply a housing or second housing). In some embodiments, the inflatable airbag cushion 102 can be coupled to the inflatable airbag cushion housing 104, and the inflatable support member 106 can be coupled to the inflatable support member housing 108. In certain embodiments, such as the embodiment of FIGS. 1A-1C, the inflatable airbag cushion housing 104 is mounted or otherwise coupled to the steering wheel 110. The inflatable support member housing 108 is mounted or otherwise coupled at a location that is in a car-forward direction of the steering wheel 110. For example, the inflatable support member housing 108 can be mounted at a location that is between the steering wheel 110 and the windshield 122, or between the steering wheel 110 and the front of the vehicle 116. In some embodiments, such as the illustrated embodiment, the inflatable support member housing 108 is coupled to the steering wheel column 112, or a steering wheel column housing. In other embodiments, the inflatable support member housing 108 is mounted or otherwise coupled to the dashboard 114 or instrument panel, or in a dashboard or instrument panel region (as is shown in FIG. 3).

In the absence of a collision event or vehicle impact event, the inflatable airbag system 100 is configured to be disposed in a packaged configuration or state (see FIG. 1A). In the packaged configuration or state, the inflatable airbag cushion 102 is disposed at the interior of the inflatable airbag cushion housing 104, and the inflatable support member 106 is disposed at the interior of the inflatable support member housing 108. While in a packaged configuration, the inflatable airbag cushion 102 and the inflatable support member 106 may each be rolled, folded, or otherwise compressed to fit within the inflatable airbag cushion housing 104 and inflatable support member housing 108 respectively.

FIGS. 1B and 1C illustrate the inflatable airbag system 100 in a deployed configuration. As can be appreciated, the inflatable airbag system 100 may be configured to deploy to provide occupant crash protection during and/or in response to a collision event or vehicle impact event. For example, the inflatable airbag system 100 can be configured to deploy in response to a frontal or oblique collision event. For instance, the inflatable airbag cushion 102 and the inflatable support member 106 may each be configured to receive an inflation gas (in response to a collision event or vehicle impact event) that may expand and/or deploy the inflatable airbag cushion 102 and the inflatable support member 106 from a packaged state within the inflatable airbag cushion housing 104 and the inflatable support member housing 108, respectively, to a deployed state. Further, during deployment, the inflatable airbag cushion 102 and the inflatable support member 106 may exit the inflatable airbag cushion housing 104 and inflatable support member housing 108 respectively, such as by opening an airbag cover (e.g., by tearing through a burst seam or opening a door-like structure).

As shown in FIGS. 1B and 1C, when the inflatable airbag system 100 is in a deployed configuration or state, the inflatable airbag cushion 102 is configured to occupy a space in a car-rearward direction relative to the steering wheel 110. The inflatable support member 106 is also configured to occupy a space between the inflatable airbag cushion 102 and the windshield 122 and/or dashboard 114. In certain embodiments, the inflatable support member 106 is configured to contact and/or urge a portion of the inflatable airbag cushion 102 in a car-rearward direction that is towards the occupant 118 of the vehicle 116. In some of such embodiments, the inflatable support member 106 urges a portion (e.g., an upper portion) of the inflatable airbag cushion 102 away from the steering wheel 110 in a car-rearward direction that is towards an occupant 118 of the vehicle 116. In further embodiments, the inflatable support member 106 may extend over a portion of the steering wheel 110. For example, the inflatable support member 160 may extend over and wrap around a portion of the steering wheel 110. The inflatable support member 106 may also abut a portion of the windshield 122 in certain instances. In other instances, the inflatable support member 106 is configured to not contact and/or abut the windshield 122.

FIG. 1C illustrates the inflatable airbag system 100 in a deployed configuration, wherein the occupant 118 is moving in a forward direction relative to the vehicle 116 during a vehicle impact event. During a collision event or vehicle impact event (when the inflatable airbag system 100 is in a deployed configuration), the inflatable airbag cushion 102 may be configured to receive the face and/or torso of an occupant 118, thereby reducing the force of the occupant 118 on denser structures about the vehicle 116. When the inflatable support member 106 abuts the upper portion of the inflatable airbag cushion 102 and urges the inflatable airbag cushion 102 in a car-rearward direction towards the occupant 118 of the vehicle 116, the inflatable airbag cushion 102 may have a greater potential to reduce the car-forward movement of the occupant 118 during a collision event or vehicle impact event.

As shown in FIG. 1C, when the inflatable airbag system 100 is in a deployed configuration, the inflatable support member 106 can change the orientation and/or the surface orientation of the inflatable airbag cushion 102. For example, in some embodiments the inflatable airbag cushion 102 has a substantially circular and symmetrical shape. The inflatable airbag cushion 102 can also comprise an outer perimeter that extends around an outer peripheral edge of the inflatable airbag cushion 102. In some embodiments, the outer perimeter is substantially symmetrical. And in certain embodiments, the outer perimeter defines a first radial plane 124 that extends through the inflatable airbag cushion 102. The steering wheel 110 can define a second radial plane 126 that extends through the steering wheel 110.

As shown in FIG. 1C, the first radial plane 124 is disposed at a first angle $\theta$ relative to the second radial plane 126. As further shown in FIG. 1C, when the inflatable airbag system 100 is in a deployed configuration, the inflatable support member 106 urges at least a portion (e.g., an upper portion) of the inflatable airbag cushion 102 in a car-rearward direction towards the occupant 118 and/or seat 120 such that the first angle $\theta$ defined by the first radial plane 124 and the second radial plane 126 is not zero. In other words, the first radial plane 124 of the inflatable airbag cushion 102 is not parallel to or coplanar with the second radial plane 126 of the steering wheel 110.

As further shown in FIG. 1C, the orientation of the occupant receiving surface of the inflatable airbag cushion 102 can also be affected by the inflatable support member 106. For example, the inflatable airbag cushion 102 can comprise an occupant receiving surface that is configured to receive the occupant 118 during a collision event. The occupant receiving surface can be a rearward facing surface of the inflatable airbag cushion 102. In some embodiments, the occupant receiving surface can be configured to be more vertical with respect to the occupant 118 due to the interaction from the inflatable support member 106. For example, the occupant receiving surface can be disposed at a first angle relative to the occupant 118 of the vehicle 116. As compared to the steering wheel 110, which is disposed at a second angle relative to the occupant 118, the first angle (or the angle of the occupant receiving surface) can be less than the second angle (or the angle of the steering wheel 110) relative to the occupant 118. Orienting the occupant receiving surface in such a manner can be advantageous for protecting an occupant 118 during a collision event.

Use of an inflatable support member 106 can also be advantageous in circumstances in which the steering wheel 110 can be tilted or adjusted relative to the occupant 118 and/or steering wheel column 112. For example, in some instances, the steering wheel 110 can be tilted, which can change the orientation of traditional inflatable airbag cushions. Changing the orientation can also cause portions of the inflatable airbag cushion to be located further away from the occupant and/or the occupant's head or upper torso. As disclosed herein, use of an inflatable support member 160 can urge a portion (e.g., an upper portion) of the inflatable airbag cushion 102 towards the occupant 118 (or the occupant's head or upper torso), even if the steering wheel 110 is tilted.

The order of deployment between the inflatable support member 106 and the inflatable airbag cushion 102 can vary. For example, in some embodiments, the inflatable support member 106 may be configured to deploy before the inflatable airbag cushion 102. In other embodiments, the inflatable support member 106 may be configured to deploy after the inflatable airbag cushion 102. It yet other embodiments, the inflatable support member 106 and the inflatable airbag cushion 102 deploy simultaneously.

Figure 2:
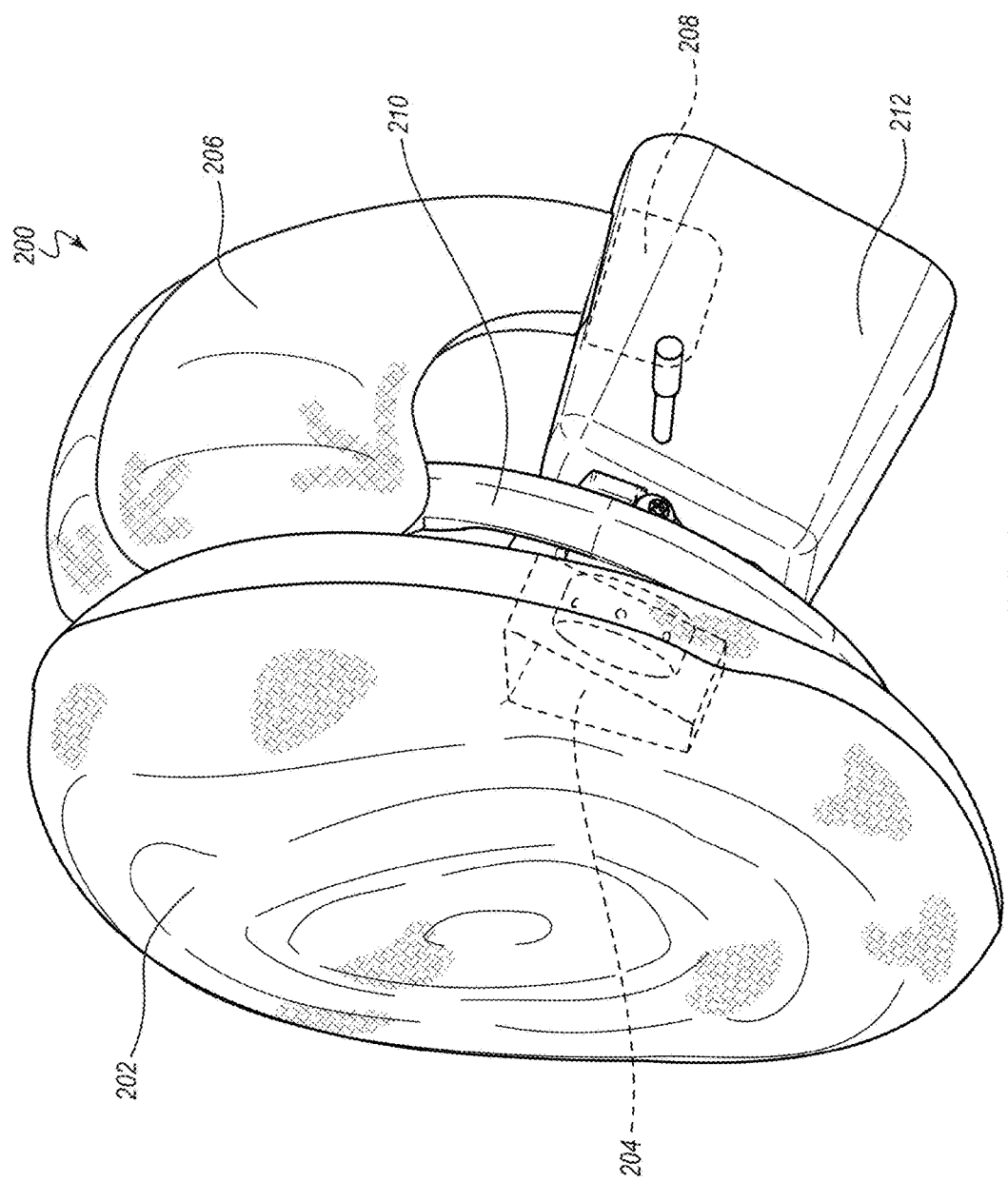
FIG. 2 is a perspective view of an inflatable airbag system, according to another embodiment of the present disclosure.

FIG. 2 depicts another embodiment of an inflatable airbag system 200. The inflatable airbag system 200 can, in certain respects, resemble components of the inflatable airbag system 100 described in connection with FIGS. 1A-1C above. It will be appreciated that the illustrated embodiments may have analogous features. Accordingly, like features are designated with like reference numerals, with the leading digits incremented to "2." (For instance, the inflatable airbag cushion is designated "102" in FIGS. 1A-1C, and an analogous inflatable airbag cushion is designated as "202" in FIG. 2.) Relevant disclosure set forth above regarding similarly identified features thus may not be repeated hereafter. Moreover, specific features of the inflatable airbag system 200 and related components shown in FIG. 2 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the inflatable airbag system 200 of FIG. 2. Any suitable combination of the features, and variations of the same, described with respect to the inflatable airbag system 100 and components illustrated in FIGS. 1A-1C, can be employed with the inflatable airbag system 200 and components of FIG. 2, and vice versa. This pattern of disclosure applies equally to further embodiments depicted in subsequent figures and described hereafter.

FIG. 2 is a perspective view of the inflatable airbag system 200 in a deployed configuration. The inflatable airbag system 200 comprises an inflatable airbag cushion 202, an inflatable support member 206, an inflatable airbag cushion housing 204, and an inflatable support member housing 208. As shown in FIG. 2, in some embodiments the inflatable airbag cushion 202 is deployed such that it extends from the inflatable airbag cushion housing 204, and the inflatable support member 206 is deployed such that it extends from the inflatable support member housing 208. Further, the inflatable airbag cushion housing 204 is shown coupled to a steering wheel 210, and the inflatable support member housing 208 is shown coupled to a steering wheel column 212 (or steering wheel column housing).

As further shown in FIG. 2, the inflatable airbag cushion 202 comprises a substantially round-shaped cushion that comprises an outer perimeter that defines a substantially circular shape. In the deployed configuration or state, the inflatable airbag cushion 202 occupies a space in a car-rearward direction from the steering wheel 210. In the illustrated embodiment, the inflatable support member 206 is also configured to extend over a portion of the steering wheel 210, or in some configurations to wrap around a portion of the steering wheel 210. The inflatable support member 206 also occupies a space that is above the steering wheel column 212 and over a portion of the steering wheel 210. Further, the inflatable support member 206 is configured to contact a portion of the inflatable airbag cushion 202, such that the inflatable support member 206 urges the upper portion of the inflatable airbag cushion 206 away from the steering wheel 210.

FIG. 3 depicts an embodiment of an inflatable airbag system 300 mounted within the frontal region of a vehicle 316, where within the vehicle 316, an occupant 318 is positioned on a seat 320. As shown in FIG. 3, the vehicle 316 comprises a windshield 322, a steering wheel 310, a steering wheel column 312, and a dashboard 314. In FIG. 3, the inflatable airbag system 300 is in a deployed configuration.

In the illustrated embodiment, the inflatable airbag system 300 comprises one or more of an inflatable airbag cushion 302, an inflatable airbag cushion housing 304, an inflatable support member 306, and an inflatable support member housing 308. As further shown in FIG. 3, in some embodiments, the inflatable support member housing 308 is coupled to the upper portion of the dashboard or instrument panel 314.

When the inflatable airbag system 300 is in a deployed configuration (as shown in FIG. 3), the inflatable airbag cushion 302 occupies a space in a car-rearward direction from the steering wheel 310 towards the occupant 318. Also, the inflatable support member 306 occupies a space between the windshield 322 and the inflatable airbag cushion 302. Specifically, the inflatable support member 306 occupies a space that is above a portion of the dashboard 322, over the steering wheel column 312, and over a portion of the steering wheel 310. In some embodiments, it may be possible that the inflatable support member 306 wraps around a portion of the steering wheel 310.

Although not shown in FIG. 3, the inflatable airbag system 300 may be in a packaged configuration or state during the absence of a collision event or vehicle impact event. While the inflatable airbag system 300 is in the packaged configuration or state, the inflatable airbag cushion 302 and the inflatable support member 306 may be rolled, folded, or otherwise compressed to fit within the inflatable airbag cushion housing 304 and inflatable support member housing 308 respectively.

As previously discussed, the inflatable airbag system 300 may be configured to deploy in response to a collision event or vehicle impact event. During such an event, the inflatable airbag cushion 302 may receive an inflation gas to inflate the inflatable airbag cushion 302, and the inflatable support member 306 may receive an inflation gas to inflate the inflatable support member 306 such that both the inflatable airbag cushion 302 and the inflatable support member 306 expand rapidly and exit their respective housings 304, 308. When the inflatable airbag system 300 is in a deployed configuration, the inflatable support member 306 may contact the windshield 322 on one side, and contact the inflatable airbag cushion 302 on another side. In other embodiments, the inflatable support member 306 does not contact or abut the windshield 322. The inflatable support member 306 may abut the inflatable airbag cushion 302 such that the upper portion of the inflatable airbag cushion 302 is urged in a car-rearward direction from the steering wheel 310 towards the occupant 318, thereby providing a greater potential to reduce the speed of the occupant 318 relative to the vehicle 316.

Figure 4:
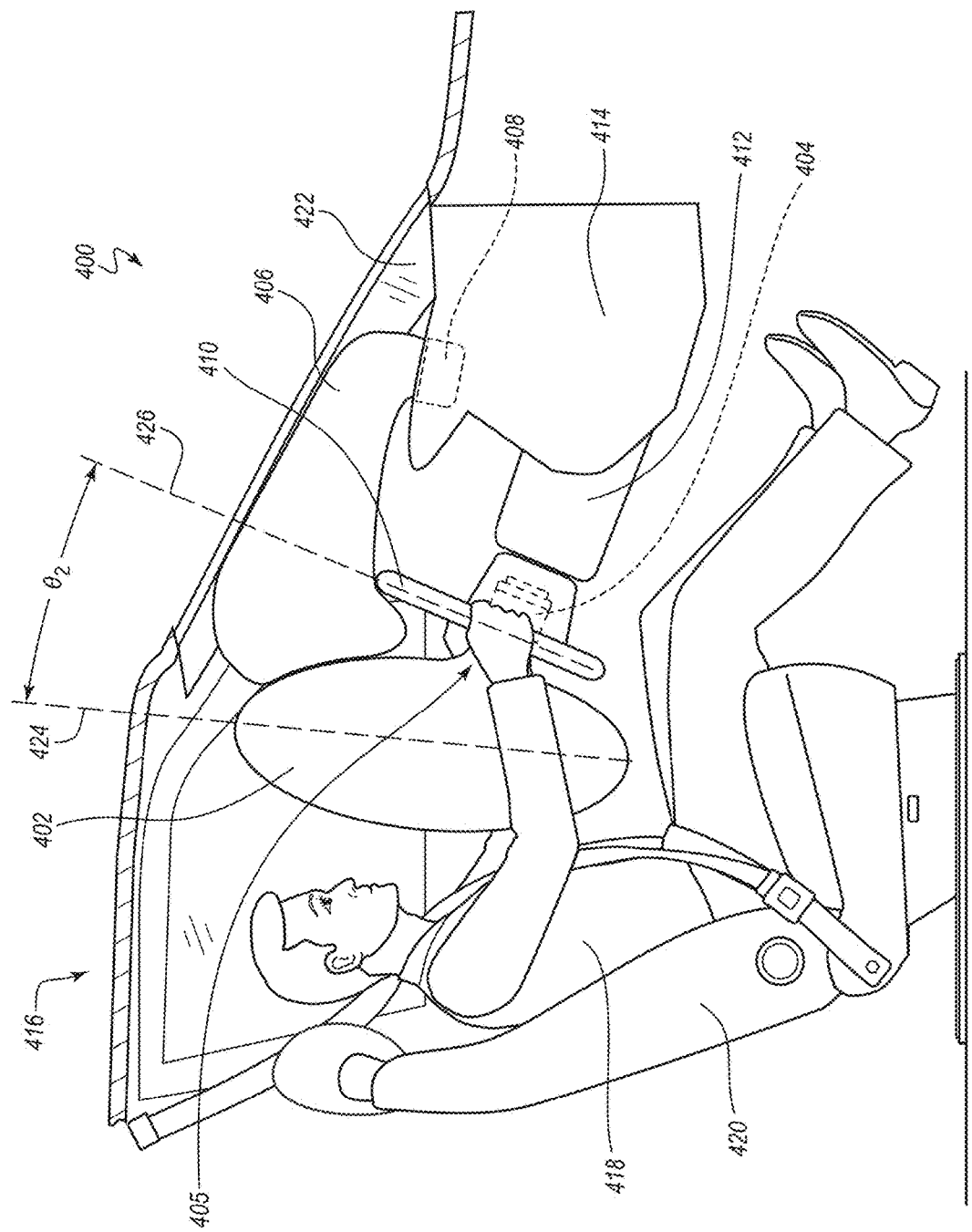
FIG. 4 is a side view of an interior side of a vehicle having an inflatable airbag system depicted in a deployed configuration, according to another embodiment of the present disclosure.

FIG. 4 depicts an embodiment of an inflatable airbag system 400 mounted within the frontal region of a vehicle 416, where within the vehicle 416, an occupant 418 is positioned on a seat 420. Similar to FIG. 3, the vehicle 416 of FIG. 4 comprises one or more of a windshield 422, a dashboard 414, a steering wheel 410, and a steering wheel column 412. In FIG. 4, the inflatable airbag system 400 is also in a deployed configuration.

The inflatable airbag system 400 comprises one or more of an inflatable airbag cushion 402, and inflatable airbag cushion housing 404, an inflatable support member 406, and an inflatable support member housing 408. Also shown in FIG. 4 is an extension hub 405 that is coupled to (or a part of) the inflatable airbag cushion 402. For example, the extension hub 405 couples the inflatable airbag cushion 402 to the inflatable airbag cushion housing 404 and/or the steering wheel 410 such that the inflatable airbag cushion 402 extends away from the steering wheel 410 in a car-rearward direction.

Although not shown in FIG. 4, the inflatable airbag system 400 may be in a packaged configuration or state during the absence of a collision event or vehicle impact event. While in the packaged configuration, the inflatable airbag cushion 402 and the inflatable support member 406 may be rolled, folded, or otherwise compressed to fit within the inflatable airbag cushion housing 404 and the inflatable support member housing 408 respectively.

When the inflatable airbag system 400 is in a deployed configuration (as shown in FIG. 4), the inflatable airbag cushion 402 occupies a space in a car-rearward direction from the steering wheel 410 towards the occupant 418. The extension hub 405 can allow the inflatable airbag cushion 402 to be disposed at a greater distance from the steering wheel 410 when deployed. In some embodiments, the extension hub 405 can allow for greater rotation of the inflatable airbag cushion 402 as it is urged or otherwise contacted by the inflatable support member 406. For example, the extension hub 405 may allow the inflatable airbag cushion 402 to pivot around the extension hub 405 such that when the inflatable support member 406 contacts the inflatable airbag cushion 402, the inflatable support member 406 may urge the inflatable airbag cushion 402 in a car-rearward direction from the steering wheel 410 towards the occupant 418 to a greater extent.

As further shown in FIG. 4, when the inflatable airbag system 400 is in a deployed configuration, the inflatable support member 406 can change the orientation and/or the surface orientation of the inflatable airbag cushion 402. For example, in some embodiments the inflatable airbag cushion 402 has a substantially circular and symmetrical shape. The inflatable airbag cushion 402 can also comprise an outer perimeter that extends around an outer peripheral edge of the inflatable airbag cushion 402. In some embodiments, the outer perimeter is substantially symmetrical. And in certain embodiments, the outer perimeter defines a first radial plane 424 that extends through the inflatable airbag cushion 402. The steering wheel 410 can define a second radial plane 426 that extends through the steering wheel 410.

As shown in FIG. 4, the first radial plane 424 is disposed at a first angle $\theta_2$ relative to the second radial plane 426. As further shown in FIG. 4, when the inflatable airbag system 400 is in a deployed configuration, the inflatable support member 406 urges at least a portion (e.g., an upper portion) of the inflatable airbag cushion 402 in a car-rearward direction towards the occupant 418 and/or seat 420 such that the first angle $\theta_2$ defined by the first radial plane 424 and the second radial plane 426 is not zero. In other words, the first radial plane 424 of the inflatable airbag cushion 402 is not parallel to or coplanar with the second radial plane 426 of the steering wheel 410.

In certain embodiments, the extension hub 405 allows the inflatable airbag cushion 402 to pivot in such a manner that the first angle $\theta_2$ defined by the first radial plane 424 and the second radial plan 426 is greater than could otherwise be obtained without use of the extension hub 405.

Figure 5:
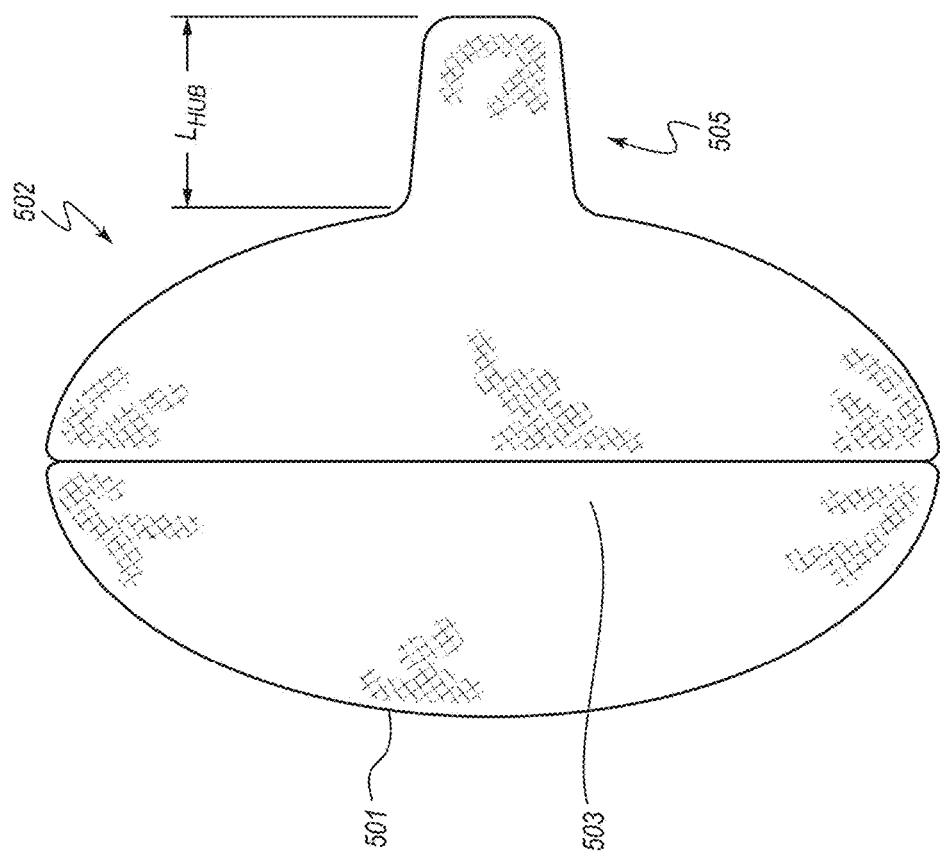
FIG. 5 is a side view of an inflatable airbag of the inflatable airbag system of FIG. 4.

FIG. 5 is a side view of an inflatable airbag cushion 502 in a deployed configuration. According to FIG. 5, the inflatable airbag cushion 502 may comprise an occupant receiving surface 501 and a body portion 503. The inflatable airbag cushion 502 also comprises an extension hub 505 having a first length $L_{HUB}$ extending from the body portion 503.

In various embodiments, the inflatable airbag cushion 502 may be coupled to an external housing (not shown) or component of a vehicle via the extension hub 505. Also, in various embodiments, the inflatable airbag cushion 502 may be configured to receive an inflation gas through a conduit in the extension hub 505, or in another portion of the inflatable airbag cushion 502.

In some embodiments, the extension hub 505 is configured to extend the body 503 of the inflatable airbag cushion 502 away from the steering wheel such that the body 503 of the inflatable airbag cushion 502 does not contact the steering wheel when not being acted upon by an outside force. In some of such embodiments, contact from an inflatable support member (such as the inflatable support members disclosed herein) can cause a portion of the inflatable airbag cushion 502 to abut a portion of the steering wheel. For example, an inflatable support member can contact the inflatable airbag cushion 502 and urge a lower portion of the inflatable airbag cushion 502 towards a lower portion of the steering wheel.

Figure 6:
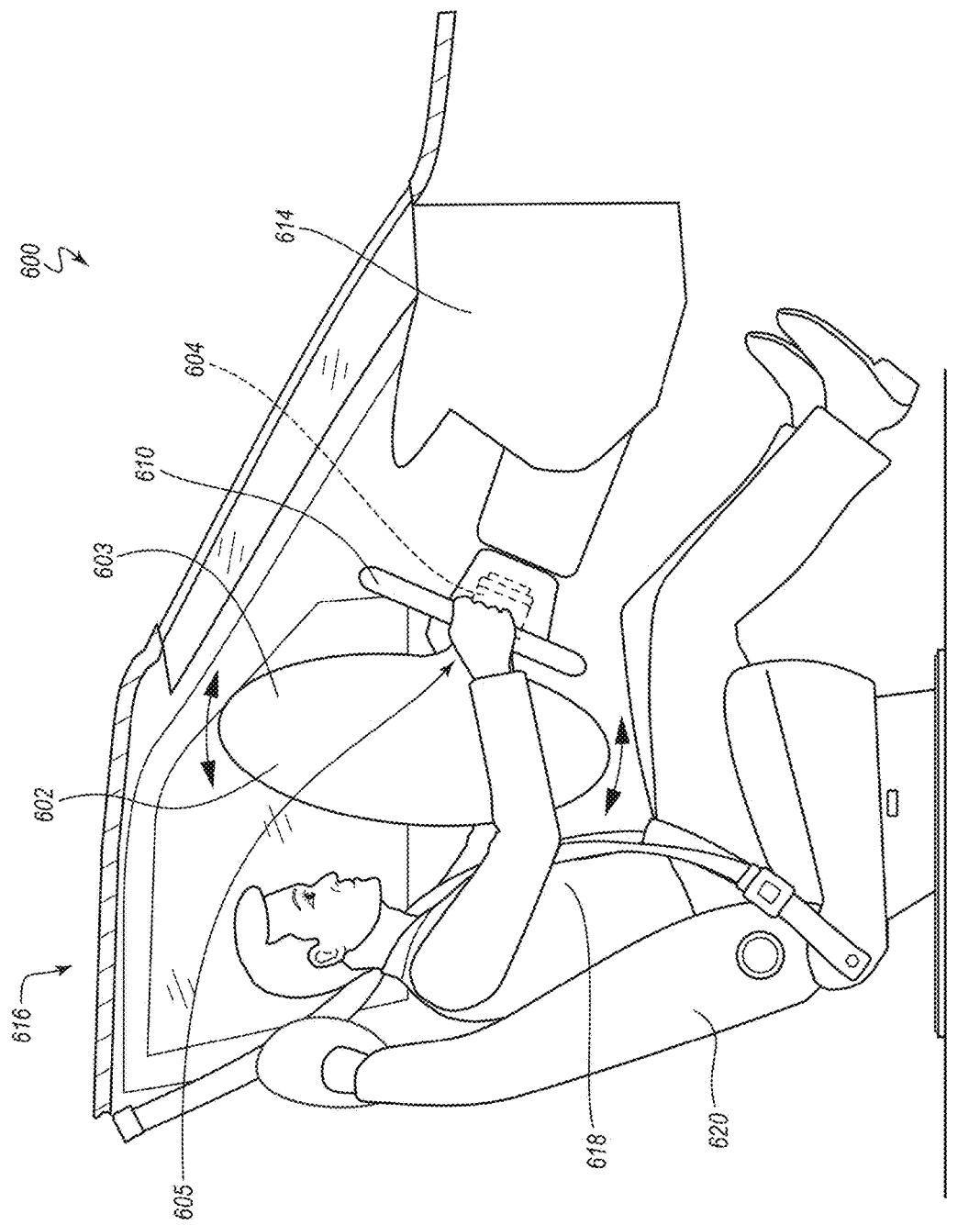
FIG. 6 is a side view of an interior side of a vehicle having an inflatable airbag system depicted in a deployed configuration, according to another embodiment of the present disclosure.

FIG. 6 depicts an inflatable airbag system 600 mounted within the frontal region of a vehicle 616, where within the vehicle 616, an occupant 618 is positioned on a seat 620. As shown in FIG. 6, the vehicle 616 can comprise one or more of a dashboard 614, a steering wheel column, and a steering wheel 610. In FIG. 6, the inflatable airbag system 600 is in a deployed configuration.

The inflatable airbag system 600 comprises one or more of an inflatable airbag cushion 602 and an inflatable airbag cushion housing 604. The inflatable airbag cushion 602 can also be coupled to the inflatable airbag cushion housing 604. The inflatable airbag cushion 602 also comprises an extension hub 605. In some embodiments, the inflatable airbag cushion 602 is coupled to the inflatable airbag cushion housing 604 via the extension hub 605.

Although not shown in FIG. 6, the inflatable airbag system 600 may be in a packaged configuration or state during the absence of a collision event or vehicle impact event. When the inflatable airbag system 600 is in a packaged configuration or state, the inflatable airbag cushion 602 may be disposed at the interior of the inflatable airbag cushion housing 604. During the absence of a collision, the inflatable airbag cushion 602 may be rolled, folded, or otherwise compressed to fit within the inflatable airbag cushion housing 604.

When the inflatable airbag system 600 is in a deployed configuration (as shown in FIG. 6), the inflatable airbag cushion 602 may occupy a space that is in a car-rearward direction from the steering wheel 610 towards the occupant 618. The extension hub 605 may also allow the inflatable airbag cushion 602 to be disposed at a location that is closer to the occupant 618.

The inflatable airbag system 600 may be configured to deploy in response to a collision event or vehicle impact event. During such an event, the inflatable airbag cushion 602 may receive an inflation gas to inflate the inflatable airbag cushion 602 such that the inflatable airbag cushion 602 expands rapidly and exits the inflatable airbag cushion housing 604. In some embodiments, the extension hub 605 may also allow the inflatable airbag cushion 602 (or the body 603 of the inflatable airbag cushion 602) to pivot or otherwise rotate. For example, the inflatable airbag cushion 602 can pivot about the extension hub 605, as illustrated by the reference arrows. In certain embodiments, rotation or pivoting of the inflatable airbag cushion 602 can reduce the force associated with the occupant 618 impacting the inflatable airbag cushion 602.

Throughout this specification, the phrase "coupled to" refers to any form of interaction between two or more entities, including mechanical, electrical, magnetic, electromagnetic, fluid, and thermal interaction. Two components may be coupled to each other even though they are not in direct contact with each other. The term "abut" refers to items that are in direct physical contact with each other, although the items may not necessarily be attached together.

The term "attached to" refers to interaction between two or more entities which are in direct contact with each other and/or are separated from each other only by a fastener of any suitable variety (e.g., mounting hardware or an adhesive).

As used herein, the terms "forward" and "rearward" are used with reference to the front and back of the relevant vehicle. For example, an airbag cushion that deploys in a rearward direction deploys toward the back of a vehicle. The terms "a" and "an" can be described as one, but not limited to one.

The term "occupant" refers to a person or crash test dummy within a vehicle.

Unless otherwise stated, all ranges include both endpoints and all numbers between the endpoints.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 ¶6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag system that is configured to be mounted at a frontal region of a vehicle, the inflatable airbag system comprising:
    an inflatable airbag cushion configured to expand and deploy out of a first housing from a packaged configuration to a deployed configuration to provide occupant crash protection during a collision event, wherein the first housing is configured to be mounted to a steering wheel of a vehicle; and
    an inflatable support member configured to deploy out of a second housing from a packaged configuration and to expand upward and rearward over a steering wheel to a deployed configuration, wherein the inflatable support member in the deployed configuration is configured to contact the inflatable airbag cushion in the deployed configuration and urge a portion of the inflatable airbag cushion in a car-rearward direction that is towards an occupant of the vehicle.

2. The inflatable airbag system of claim 1, wherein the inflatable airbag cushion and the inflatable support member are configured to deploy in response to a frontal or oblique collision event.

3. The inflatable airbag system of claim 1, wherein the second housing is configured to be mounted at a location that is in a car-forward direction of the steering wheel.

4. The inflatable airbag system of claim 3, wherein the second housing is configured to be mounted to a steering column or a steering column housing of the vehicle.

5. The inflatable airbag system of claim 3, wherein the second housing is configured to be mounted to a dashboard or an instrument panel of the vehicle.

6. The inflatable airbag system of claim 1, wherein the inflatable support member is configured to extend over a portion of the steering wheel when in the deployed configuration, wherein the inflatable support member is further configured to urge the portion of the inflatable airbag cushion away from the steering wheel.

7. The inflatable airbag system of claim 1, wherein the inflatable support member is configured to wrap around at least a portion of the steering wheel when in the deployed configuration.

8. The inflatable airbag system of claim 1, wherein the inflatable airbag cushion comprises an outer perimeter that defines a first radial plane extending through the inflatable airbag cushion when in the deployed configuration, wherein the outer perimeter extends around a peripheral edge of the inflatable airbag cushion,
    wherein the steering wheel of the vehicle defines a second radial plane extending through the steering wheel, and
    wherein the first radial plane is not parallel to or coplanar with the second radial plane.

9. The inflatable airbag system of claim 1, wherein the inflatable airbag cushion comprises an occupant receiving surface disposed at a first angle relative to the occupant of the vehicle, wherein the steering wheel is disposed at a second angle relative to the occupant of the vehicle, and wherein the inflatable support member is configured to urge the portion of the inflatable airbag cushion such that the first angle is less than the second angle.

10. The inflatable airbag system of claim 1, wherein the inflatable airbag cushion comprises a round-shaped cushion such that the inflatable airbag cushion comprises an outer perimeter that defines a substantially circular shape when in the deployed configuration.

11. The inflatable airbag system of claim 1, wherein the inflatable support member is configured to deploy prior to deployment of the inflatable airbag cushion in response to the collision event.

12. The inflatable airbag system of claim 1, wherein the inflatable support member is configured to deploy after deployment of the inflatable airbag cushion in response to the collision event.

13. The inflatable airbag system of claim 1, wherein the inflatable support member and the inflatable airbag cushion are configured to deploy simultaneously in response to the collision event.

14. The inflatable airbag system of claim 1, wherein the inflatable airbag cushion comprises an extension hub that extends from a body of the inflatable airbag cushion, wherein the extension hub is configured to couple the inflatable airbag cushion to the first housing and extend the body of the inflatable airbag cushion away from the first housing.

15. The inflatable airbag system of claim 14, wherein the extension hub is configured to extend the body of the inflatable airbag cushion away from the steering wheel such that the body of the inflatable airbag cushion does not contact the steering wheel when not being acted upon by an outside force.

16. The inflatable airbag system of claim 14, wherein the inflatable airbag cushion is configured to pivot about the extension hub as the inflatable support member contacts the inflatable airbag cushion.

17. An inflatable airbag system that is configured to be mounted at a frontal region of a vehicle, the inflatable airbag system comprising:
 an inflatable airbag cushion configured to expand and deploy to provide occupant crash protection during a collision event; and
 an inflatable support member configured to deploy and expand upward and rearward over a steering wheel to urge a portion of the inflatable airbag cushion in a deployed configuration away from a steering wheel in response to the collision event.

18. The inflatable airbag system of claim 17, wherein the inflatable support member is configured to expand and deploy from a housing that is coupled to a dashboard, an instrument panel, a steering column, or a steering column housing of the vehicle.

19. The inflatable airbag system of claim 17, wherein the inflatable support member is configured to wrap around at least a portion of the steering wheel when in the deployed configuration.

20. The inflatable airbag system of claim 17, wherein the inflatable airbag cushion comprises an outer perimeter that defines a first radial plane extending through the inflatable airbag cushion when in the deployed configuration, wherein the outer perimeter extends around a peripheral edge of the inflatable airbag cushion,
 wherein the steering wheel of the vehicle defines a second radial plane extending through the steering wheel, and
 wherein the first radial plane is not parallel to or coplanar with the second radial plane.

21. The inflatable airbag system of claim 17, wherein the inflatable airbag cushion comprises an occupant receiving surface disposed at a first angle relative to an occupant of the vehicle, wherein the steering wheel is disposed at a second angle relative to the occupant of the vehicle, and wherein the inflatable support member is configured to urge the portion of the inflatable airbag cushion such that the first angle is less than the second angle.

22. An inflatable airbag system that is configured to be mounted at a frontal region of a vehicle, the inflatable airbag system comprising:
 an inflatable airbag cushion configured to expand and deploy out of a first housing from a packaged configuration to a deployed configuration to provide occupant crash protection during a collision event, wherein the first housing is configured to be mounted to a steering wheel of a vehicle,
 wherein the inflatable airbag cushion comprises an extension hub that extends from a body of the inflatable airbag cushion, wherein the extension hub is configured to pivotably couple the inflatable airbag cushion to the first housing and extend the body of the inflatable airbag cushion away from the first housing.

23. The inflatable airbag system of claim 22, wherein the extension hub is configured to extend the body of the inflatable airbag cushion away from the steering wheel such that the body of the inflatable airbag cushion does not contact the steering wheel when not being acted upon by an outside force.

24. The inflatable airbag system of claim 22, wherein the inflatable airbag cushion is configured to pivot about the extension hub.

* * * * *